United States Patent
Melton (10) Patent No.: US 9,751,630 B1
(45) Date of Patent: Sep. 5, 2017

(54) TRAY TABLE DEVICE

(71) Applicant: RECARO Aircraft Seating GmbH & Co. KG, Schwaebisch Hall (DE)

(72) Inventor: Clinton Melton, Denton, TX (US)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 0 days.

(21) Appl. No.: 15/194,973

(22) Filed: Jun. 28, 2016

(51) Int. Cl.
*B64D 11/06* (2006.01)
*A47C 7/70* (2006.01)

(52) U.S. Cl.
CPC ............ *B64D 11/0638* (2014.12); *A47C 7/70* (2013.01)

(58) Field of Classification Search
CPC ... B64D 11/0638; B64D 11/0627; A47C 7/68; A47C 7/70
See application file for complete search history.

(56) References Cited

U.S. PATENT DOCUMENTS

| | | | | |
|---|---|---|---|---|
| 6,279,992 B1* | 8/2001 | Plocher | .................. | B60N 3/004 108/44 |
| 2011/0240810 A1* | 10/2011 | France | .................. | B60N 3/102 248/220.21 |
| 2012/0032479 A1* | 2/2012 | Suhre | ..................... | B60N 3/102 297/188.01 |
| 2013/0062382 A1* | 3/2013 | Alford | .................. | B60N 3/103 224/482 |
| 2014/0327278 A1* | 11/2014 | Curtis | .................... | A47B 83/02 297/163 |
| 2015/0353200 A1* | 12/2015 | Thomaschewski | .... | B60N 3/102 297/188.15 |
| 2016/0022043 A1* | 1/2016 | Czumaj-Bront | ....... | A47C 7/004 297/172 |
| 2016/0152169 A1* | 6/2016 | Zheng | ................ | B64D 11/0636 297/163 |

FOREIGN PATENT DOCUMENTS

DE       10 2004 037 914 B4       8/2006

* cited by examiner

*Primary Examiner* — Daniel Rohrhoff
(74) *Attorney, Agent, or Firm* — Posz Law Group, PLC (57) ABSTRACT

The invention relates to a tray table device, in particular a passenger seat tray table device, with at least one table unit, and with at least one cup holder unit which is provided in at least one position of use to at least partly hold at least one drinking vessel. The cup holder unit is movably mounted to the table unit.

17 Claims, 4 Drawing Sheets

TRAY TABLE DEVICE

PRIOR ART

The invention relates to a tray table device according to the preamble of patent claim 1.

A tray table of an aircraft passenger seat with an integrated cup holder has already been proposed. For instance, a circular through hole in a tray table, in which a cup can be placed, is known from DE 10 2004 037 914 B4.

The objective of the invention is, in particular, to provide a tray table device with improved properties regarding comfort.

SUMMARY OF THE INVENTION

The invention relates to a tray table device, in particular a passenger seat tray table device, with at least one table unit, and with at least one cup holder unit which is provided in at least one position of use to at least partly hold at least one drinking vessel.

It is proposed that the cup holder unit is movably mounted to the table unit.

In this context, by "tray table device" in particular is to be understood at least a portion, preferably an advantageously functioning sub-assembly group of a tray table, in particular a passenger seat tray table, in particular an aircraft passenger seat tray table. In particular, the tray table device can contain the entire tray table. A "passenger seat" in particular is a seat for a user of a vessel, particularly for a travel guest, for instance of a ship or a bus or an aircraft or a train.

Preferably, the table unit features at least one table plate with at least one table plate surface, which advantageously is provided to hold at least one item which is placed on the table plate surface, for instance a plate and/or a bowl and/or a book and/or a computer and/or a magazine and/or other items of a passenger. Advantageously, the table unit is implemented as a table plate. By "provided" is to be understood, in particular, specifically designed and/or equipped. By an object being provided for a certain function is to be understood, in particular, that the object implements and/or carries out said certain function in at least one application state and/or operation state.

Preferentially, the tray table device features at least one mounting unit for mounting the tray table device to a passenger seat, preferably to a frame and/or a backside and/or an armrest and/or a shell and/or a housing of a passenger seat unit and/or its partition wall. It is conceivable that the mounting unit features at least one swivel arm, which is provided to connect the table unit to the passenger seat. Additionally or alternatively, it is conceivable that the mounting unit features at least one bearing, which is provided to connect the table unit to the passenger seat pivotably around at least one pivot axis. Advantageously, the mounting unit is provided to mount the table unit retractably and/or foldably to the passenger seat.

Advantageously, in the position of use the cup holder unit provides a holding force which counteracts at least a part of a weight force of the drinking vessel. Preferably, the cup holder unit features at least one cup holder element, which in the position of use is in contact with the drinking vessel. Preferentially, the cup holder unit features at least one guide element, which is in contact with the table unit and advantageously at least partly limits a movability of the cup holder unit with respect to the table unit. It is conceivable that the cup holder unit is a one-piece unit.

By means of the invention, improved properties regarding comfort can be achieved. Furthermore, a range of possible applications of a tray table can be expanded advantageously. In particular, high safety and/or user-friendliness can be achieved. The invention allows providing an advantageous tray table with a low demand for space and/or small folding size. A user demand concerning table space and item storage can be met in a preferable manner. Additionally, potentially low fabrication and/or installation costs can be achieved. Furthermore, a cup holder with retrofit capability can be provided. Advantageously, a cup holder is provided, which can be used while also using a tray table, for instance while working on a laptop or tablet computer. Besides, a cup holder can be provided, which is preferentially robust and/or less susceptible to damage.

In another embodiment of the invention it is proposed that in the position of use the cup holder unit and the table unit, in particular together, implement at least one holding zone for the drinking vessel. Preferably, the holding zone comprises at least one holding recess, in which the drinking vessel can be placed. Advantageously, the holding recess is a through hole. Preferentially, the holding recess is at least substantially circular. Preferably, the cup holder unit features at least one first recess and the table unit features at least one second recess, which in the position of use contact one another and implement the holding recess. In particular, an area of the holding recess at least substantially corresponds to the area of the first recess. In this context by the term "at least substantially" is to be understood that a deviation of a first value from a second value is in particular smaller than 25%, preferably smaller than 10% and advantageously smaller than 5% of the second value. Advantageously, the drinking vessel features at least one cross section with a shape that corresponds to a shape of the holding recess. Preferably, in the position of use the drinking vessel intersects a main plane of extent of the cup holder and/or a main plane of extent of the table unit. A "main plane of extent" of an object is, in particular, to be understood as a plane extending parallel to a largest side of a smallest imaginary rectangular cuboid which entirely encloses the object and preferably extends through a geometric center of the object. As a result, an advantageously compact construction can be realized.

In a preferred embodiment of the invention it is proposed that in the position of use at least a part of an outer contour of the table unit, in particular of the second recess, implements at least a part of the holding zone, in particular at least a part of an outer contour of the holding zone. Preferentially, the outer contour of the holding zone is an outer contour of the holding recess. Preferably, the outer contour of the table unit implements at least a part of an outer contour of the tray table device. Advantageously, the outer contour of the table unit features a shape, in particular an approximately rectangular shape, with at least one indentation which in the position of use implements the holding recess together with the first recess of the cup holder unit. In particular, the indentation is implemented by the second recess of the table unit. As a result, a tray table with a dual function and/or a dual usability can be provided.

In a further embodiment of the invention it is proposed that in the position of use the cup holder unit is at least partly located outside a smallest imaginary cuboid containing the table unit. Preferentially, in the position of use a center of gravity of the cup holder unit is located outside the smallest imaginary cuboid containing the table unit. Preferably, in the position of use the cup holder unit is at least partly located next to the table unit, in particular in a view perpendicular to the main plane of extent of the table unit. Advantageously, in the position of use the center of gravity of the cup holder unit is at least partly located next to the table unit in a view perpendicular to the main plane of extent of the table unit. As a result, it is advantageously possible to simultaneously use a tray table for placing items and a cup holder.

In a preferred embodiment of the invention it is proposed that the cup holder unit is located at a rear edge of the table unit. In particular, the rear edge of the table unit is facing away from a passenger using the tray table device, particularly in an unfolded state of the tray table device. Preferentially, in the unfolded state of the tray table device the rear edge of the table unit is facing toward a backside of a passenger seat to which the tray table device is mounted. Advantageously, the cup holder unit is arranged between the table unit and the mounting unit. Preferably, the cup holder unit is mounted to the mounting unit. Preferentially the table unit is mounted to the mounting unit pivotably around at least one pivot axis. Advantageously, the frame unit features at least one bar, which runs at least substantially parallel to the pivot axis, to which barthe cup holder unit is mounted. As a result, advantageous properties concerning safety can be achieved. Besides, damage of a cup holder can be advantageously avoided.

In another embodiment of the invention it is proposed that the cup holder unit is sliding-mounted to the table unit. Preferentially, a sliding direction is at least substantially parallel to the main plane of extent of the table unit. As a result, an intuitively movable cup holder can be provided.

In an alternative embodiment of the invention it is proposed that the cup holder unit is swivel-mounted to the table unit. Preferably, a swivel axis runs at least substantially parallel to at least one edge of the table unit, preferentially a front edge or a side edge of the table unit. In this context "at least substantially parallel" is in particular to be understood as an orientation of a direction with respect to a reference direction, in particular in a plane, wherein the direction has a deviation from the reference direction in particular of less than 15°, advantageously of less than 10° and particularly advantageously of less than 2°. In particular, the cup holder can swivel about an angle of at least 90°, advantageously of at least 150°, preferentially of at least 170°, and preferably of 180°. As a result, a cup holder with easy and/or intuitive handling can be provided. In a further embodiment of the invention it is proposed that the cup holder unit can be stowed in at least one stowed position. In particular, in the stowed position the cup holder unit is at least partly and preferentially completely located inside the smallest cuboid containing the table unit. Preferably, the cup holder unit is movable between the position of use and the stowed position. Preferably, in the stowed position the center of gravity of the cup holder unit is located inside the smallest imaginary cuboid containing the table unit. As a result, preferable properties concerning space requirements can be achieved.

It is conceivable that the cup holder unit is connected to the mounting unit. It is further conceivable that a position of at least one edge of the cup holder unit with respect to the mounting unit is identical in the position of use and in the stowed position. Besides, it is conceivable that the cup holder unit is moved from the stowed position to the position of use if the tray table is moved from a folded and/or retracted position to a swung-out and/or popped-up and/or expanded position.

In a further embodiment of the invention it is proposed that in the stowed position the cup holder unit and the table unit together implement at least one table surface. Preferentially, in the stowed position the cup holder unit is aligned flush with a top surface of the table unit. Particularly, in case that the cup holder unit is swivel-mounted to the table unit a backside of the cup holder implements at least a part of the table surface. As a result, a table unit can be used unobstructedly, in particular in the position of use and in the stowed position.

It is conceivable that in the stowed position the cup holder unit is aligned with a certain offset with respect to the top surface of the table unit. Particularly, the offset can be in the range of 1 mm or 2 mm or 3 mm or 5 mm or 1 cm or more. Advantageously, the cup holder unit can be gripped at an edge implemented between the top surface of the table unit and the cup holder unit due to the offset.

In a preferred embodiment of the invention it is proposed that the cup holder unit features at least one grip element. Preferably, the grip element features at least one edge, preferentially one rear edge, which is aligned parallel to at least one edge, preferentially the rear edge, of the table unit. Preferentially, the grip element features at least one protrusion, which is provided to be gripped by a user. Preferably, the protrusion of the grip element and a protrusion of the table unit together implement a protrusion, in particular on the rear edge of the table unit. Advantageously, the protrusion is provided to avoid sliding of items across the rear edge of the table unit. Advantageously, the grip unit is provided to be gripped and/or touched by the user, in particular when moving the cup holder unit between the position of use and the stowed position. As a result, a high user-friendliness and/or an easy handling can be achieved.

In an advantageous embodiment of the invention it is proposed that in the stowed position a top surface of the grip element is at least partly aligned flush with a top surface of the table unit. Preferably, the top surface is limited at one end by the protrusion of the grip element. Preferentially, the top surface has a semicircular shape, in particular in a view perpendicular to the main plane of extent of the table unit, preferably with a bent edge of the semicircular shape pointing away from the advantageously straight protrusion. Alternatively, it is conceivable that the top surface has a square shape or the shape of an elliptical segment. As a result, a cup holder unit can be stowed such that a table is fully usable.

In a preferential embodiment of the invention it is proposed that the table unit features at least one recess, in which the grip element is located in the stowed position. Advantageously, a main plane extent of the recess is arranged at least substantially parallel to the main plane of extent of the table unit. Preferably, the recess has the shape of the top surface of the grip element. Preferentially, in the stowed position the grip element is at least partly located inside the recess. Advantageously, in the position of use the recess implements part of the holding zone for the drinking vessel. In particular, the recess is the second recess of the table unit, which implements the holding recess together with the first recess of the cup holder unit. As a result, a high recognizability of a stowed cup holder can be achieved.

In another embodiment of the invention it is proposed that in the stowed position the cup holder unit and the table unit together implement at least one outside contour, which in particular features the protrusion of the grip element and the table unit. Preferably, the outside contour is a rear contour. However, it is also conceivable that the contour is a side or a front contour. As a result, high comfort and an unimpaired usability of a table can be obtained.

In a further embodiment of the invention it is proposed that the cup holder unit is at least partly located inside the table unit in the stowed position. In particular, the cup holder unit has a vertical extent which is smaller or equal to a vertical extent of the table unit. Preferably, the table unit features at least one storage cavity, in which in the stowed position at least a part of the cup holder unit is located. Preferentially, the storage cavity features at least one opening, which is located on one edge of the table unit, preferably on the rear edge of the table unit. Advantageously, a main plane of extent of the opening of the storage cavity is arranged at least substantially parallel to a surface normal of the main plane of extent of the table unit. Preferentially, the storage cavity and the recess of the table unit have at least one common edge. As a result, a cup holder unit can be safely stored and/or damage of a cup holder unit can be effectively avoided.

In a preferred embodiment of the invention it is proposed that the cup holder unit moves at least substantially parallel to the main plane of extent of the table unit during a transition between the position of use and the stowed position. Preferably, the cup holder unit can be pulled out of the storage cavity in a direction at least substantially parallel to the main plane of extent of the table unit, in particular when moving from the stowed position to the position of use. Preferentially, the cup holder unit can be pushed into the storage cavity in a direction at least substantially parallel to the main plane of extent of the table unit, in particular when moving from the position of use to the stowed position. Preferably, the frame unit features at least one element, preferentially a horizontal bar element, to which the cup holder unit is pushed when folding the tray table device. It is also conceivable that the table element is pushed against a part of the seat unit to which the tray table device is mounted, for instance a backside of the seat unit. Advantageously, the cup holder unit is pushed into the stowed position when folding the tray table. If the cup holder unit is connected to the mounting unit, it is conceivable that the cup holder unit is pulled out of the storage cavity when unfolding the tray table device and/or it is conceivable that the cup holder unit is pushed into the storage cavity when folding the tray table device. As a result, a cup holder unit can be provided which can be intuitively used and/or stowed.

In an advantageous embodiment of the invention it is proposed that the cup holder unit at least partly slides into the table unit during a transition between the position of use and the stowed position. Preferably, the storage cavity implements at least one guiding, which is provided to guide a movement of the cup holder unit during the transition between the position of use and the stowed position. As a result, an intuitive handling can be obtained and/or operating errors can be effectively avoided. Furthermore, a broken cup holder can be easily exchanged.

The invention further relates to a system with at least one tray table device according to the present invention and at least one drinking vessel. For instance, the drinking vessel can be a cup, in particular a disposable cup, such as a paper cup, or a glass or a metal cup or a pottery cup or the like. Preferentially, a shape of the drinking vessel at least partly matches a shape of the holding zone.

An advantageously high comfort can be achieved with a passenger seat featuring at least one tray table device according to the invention.

The invention further encompasses a passenger seat with a tray table according to the present invention. The term "aircraft passenger seat" is intended, in particular, to mean a seat that is mounted in an aircraft, wherein the aircraft passenger seat is preferably part of a seat row, in which two or advantageously at least three aircraft passenger seats are connected to a row and/or at least two passenger seats are arranged one behind the other to implement at least one line of seats.

It is not intended to restrict the tray table device according to the invention to the use and embodiment described above. The content of this disclosure is intended to contain all conceivable combinations of the features mentioned herein. In particular, the tray table device according to the invention can have a number of individual elements, components and units different from that mentioned herein in order to perform a function described herein. Furthermore, regarding the value ranges mentioned in this disclosure, values within the limits mentioned are to be understood to be also disclosed and to be used as applicable.

DRAWINGS

Further advantages may become apparent from the following description of the drawings. In the drawings four exemplary embodiments of the invention are shown. The drawings, the description and the claims contain a plurality of features in combination. The person having ordinary skill in the art will purposefully also consider the features separately and will find further expedient combinations.

If there is more than one specimen of a certain object, at least in some cases only one of these is given a reference numeral in the figures and the description. The description of this specimen may be correspondingly transferred to the other specimens of the object.

It is shown in.

DESCRIPTION OF THE ILLUSTRATIVE EMBODIMENTS

Figure 1:
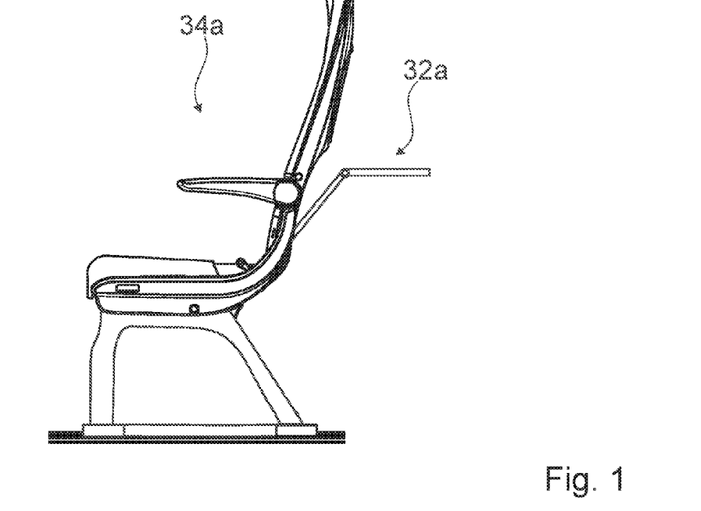
FIG. 1 a passenger seat with a tray table device in a schematic side view.

FIG. 1 shows a passenger seat 34a with a tray table device 32a in a schematic side view. The tray table device 32a is shown in an unfolded state. The tray table device 32a can be folded away to a folded state by a user.

Figure 2:
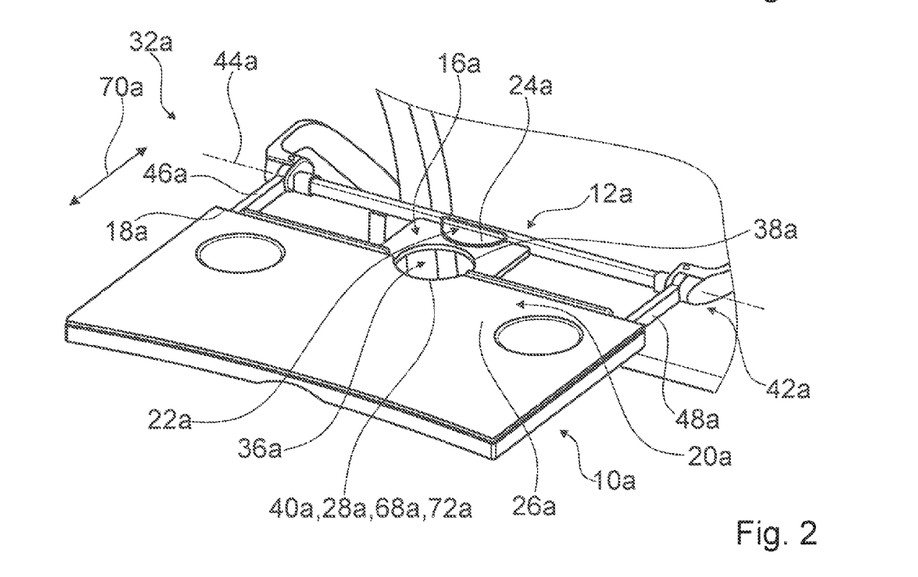
FIG. 2 the tray table device with a cup holder unit in a position of use in a perspective view, FIG. 3 a system comprising the tray table device and a drinking vessel in a perspective view, FIG. 4 the tray table device with the cup holder unit in a stowed position, FIG. 5 the tray table device in a folded state, FIG. 6 an alternative tray table device with a cup holder unit in a perspective view, FIG. 7 a further alternative tray table device with a cup holder unit in a schematic top view, FIG. 8a a further alternative tray table device with a cup holder unit in a position of use in a schematic top view, and FIG. 8b the further alternative tray table device with the cup holder unit in a stowed position in a schematic top view.

FIG. 2 shows the tray table device 32a in a perspective view. The tray table device 32a features a table unit 10a and a cup holder unit 12a. The cup holder unit 12a is provided in at least one position of use to at least partly hold at least one drinking vessel 14a (cf. FIG. 3). In FIG. 2 the cup holder unit 12a is shown in the position of use. The table unit 10a features at least one plastic compound. It is also conceivable that a table unit features at least one metal. The cup holder unit 12a features at least one plastic compound. The cup holder unit 12a is a cast plastic part. Preferentially, the cup holder unit 12a has a different color than the table unit 10a. It is also conceivable that a cup holder unit and a table unit have the same color and/or feature at least one identical material. The cup holder unit 12a is movably mounted to the table unit 10a.

The tray table device 32a features a mounting unit 42a. The mounting unit 42a allows a mounting of the tray table device 32a to a passenger seat, in the present embodiment to the passenger seat 34a. The mounting unit 42a mounts the table unit 10a pivotably around a pivot axis 44a. The mounting unit 42a features two frame elements 46a, 48a, which mount the table unit 10a movably with respect to the pivot axis 44a. The frame elements 46a, 48a mount the table unit 10a movably along a direction 70a at least substantially parallel to a main extension direction of the frame elements 46a, 48a. The table unit 10a can be slid towards the pivot axis 44a and slid away from the pivot axis 44a.

In the position of use the cup holder unit 12a and the table unit 10a implement at least one holding zone 16a for the drinking vessel 14a. The holding zone 16a features a holding recess 36a. At least in the position of use a main plane of extent of the holding recess 36a is at least substantially parallel to a main plane of extent of the table unit 10a. The holding recess 36a is configured as a through hole in which the drinking vessel 14a can be placed in the position of use. The cup holder unit 12a features a first recess 38a. The first recess 38a is a circular through hole. The table unit 10a features a second recess 40a. The second recess 40a has a semicircular shape. In the position of use the first recess 38a of the cup holder unit 12a and the second recess 40a of the table unit 10a together implement the holding recess 36a.

In the position of use at least a part of an outer contour 68a of the table unit 10a implements at least a part of the holding zone 16a. In the present case the outer contour 68a of the table unit 10a implements an outer contour 72a of the holding zone 16a. Furthermore, in the present case the outer contour 68a of the table unit 10a is an outer contour of the second recess 40a.

In the position of use the cup holder unit 12a is at least partly located outside a smallest cuboid containing the table unit 10a. In the position of use approximately half of the first recess 38a is located outside the smallest cuboid containing the table unit 10a. In the position of use a center of gravity of the cup holder unit 12a is located outside the smallest cuboid containing the table unit 10a.

The cup holder unit 12a is located on a rear edge 18a of the table unit 10a. In an unfolded state of the tray table unit 32a the rear edge 18a is facing away from a passenger using the tray table device 32a. The cup holder unit 12a is arranged between the table unit 10a and the mounting unit 42a. A main plane of extent of the cup holder unit 12a is at least substantially parallel to a main direction of extent of at least one of the frame elements 46a, 48a.

Figure 3:
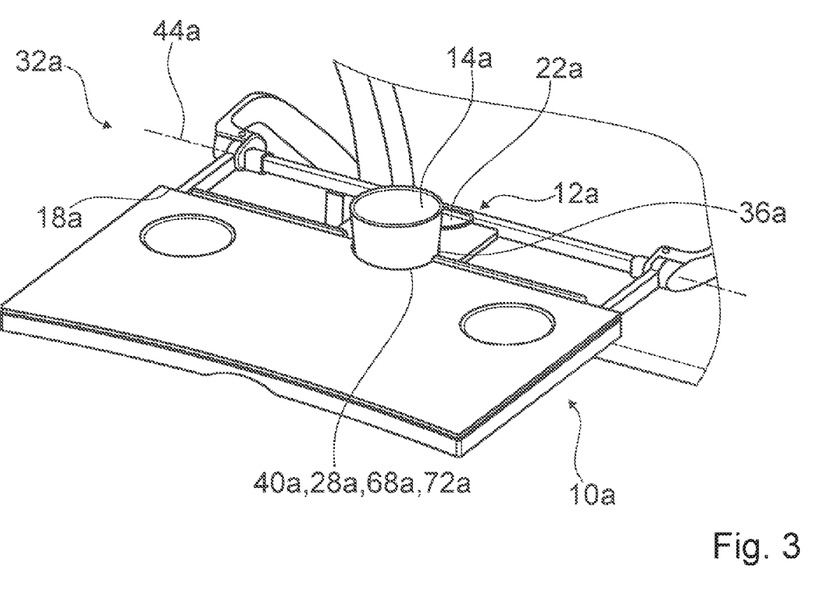

FIG. 3 shows a system comprising the tray table device 32a and the drinking vessel 14a in a perspective view. The drinking vessel 14a is a paper cup. In the position of use the drinking vessel 14a can be placed in the holding recess 36a. A shape of the drinking vessel 14a is adapted to a shape of the holding recess 36a.

Figure 4:
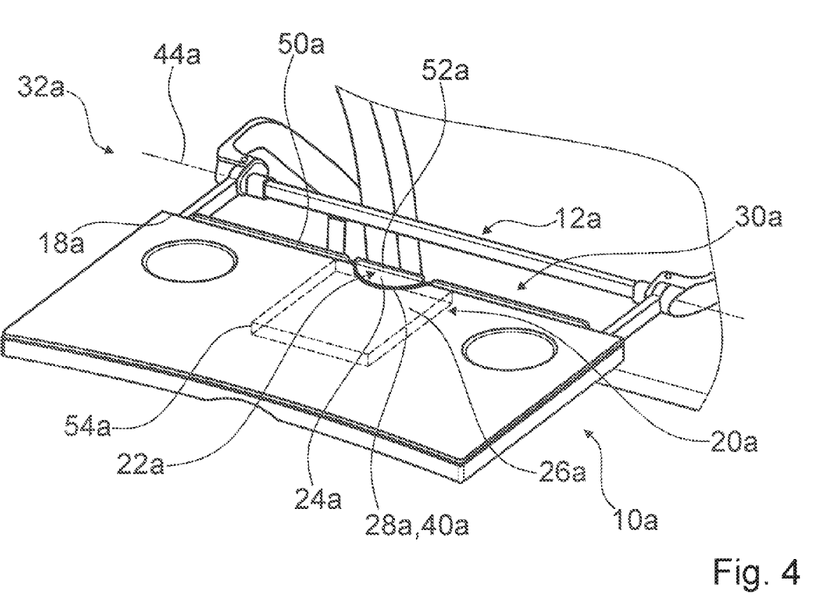

FIG. 4 shows the tray table device 32a with the cup holder unit 12a in a stowed position. The cup holder unit 12a can be stowed in the stowed position. In the stowed position the cup holder unit 12a is completely located inside the smallest cuboid containing the table unit. In the stowed position the center of gravity of the cup holder unit 12a is located inside the smallest cuboid containing the table unit 10a.

In the stowed position the cup holder unit 12a and the table unit 10a together implement at least one table surface 20a. The cup holder unit 12a features at least one grip element 22a. In the stowed position a top surface 24a of the grip element 22a is at least partly aligned flush with a top surface 26a of the table unit 10a. The grip element 22a, in particular the top surface 24a of the grip element 22a, has a semicircular shape. A shape of the grip element 22a, in particular of the top surface 24a of the grip element 22a, is at least partly adapted to a shape of the second recess 40a of the table unit 10a.

The table unit 10a features at least one recess 28a, in which the grip element 22a is located in the stowed position. In the present embodiment in the stowed position the grip element 22a is located in the second recess 40a of the table unit 10a.

In the stowed position the cup holder unit 12a and the table unit 10a together implement at least one outside contour 30a. In the present embodiment the outside contour 30a is located at the rear edge 18a of the table unit 10a. The outside contour 30a is facing away from a passenger using the tray table device 32a. The rear edge 18a of the table unit features a protrusion 50a. Furthermore, the grip element 22a features a protrusion 52a. In the stowed position the protrusion 50a of the rear edge 18a and the protrusion 52a of the grip element 22a together implement a protrusion, which is provided to avoid sliding of items across the rear edge 18a of the table unit 10a.

In the stowed position the cup holder unit 12a is at least partly located inside the table unit 10a. In the stowed position the first recess 38a of the cup holder unit 12a is located completely inside the table unit 10a. The table unit 10a features a storage cavity 54a, in which in the stowed position at least a part of the cup holder unit 12a is located. The storage cavity 54a is located inside the table unit 10a. The storage cavity 54a is open towards the pivot axis 44a. The storage cavity 54a is open at a side of the contour 30a of the table unit 10a and the cup holder unit 12a.

The cup holder unit 12a moves at least substantially parallel to a main plane of extent of the table unit 10a during a transition between the position of use and the stowed position. In order to move from the stowed position to the position of use the cup holder unit 12a can be pulled out of the storage cavity 54a. In order to move from the position of use to the stowed position the cup holder unit 12a can be pushed into the storage cavity 54a. During the transition between the position of use and the stowed position the cup holder unit 12a at least partly slides into the table unit 10a, in particular into the storage cavity 54a.

Figure 5:
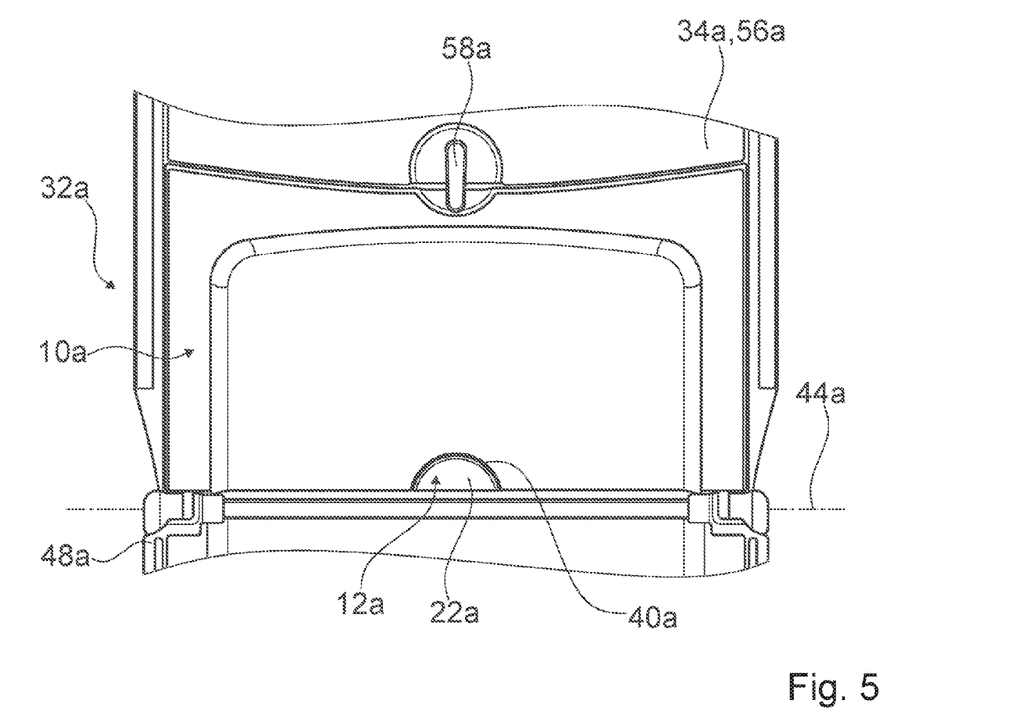

FIG. 5 shows the tray table device 32a in a folded state. In the folded state the table unit 10a is arranged at least substantially parallel to a backside 56a of the passenger seat 34a. The tray table device 32a can be held in the folded state of the tray table device 32a with a fixing element 58a, which is pivot-mounted to the backside 56a of the passenger seat 34a. In the folded state the fixing element 58a exerts a holding force to the table unit 10a. In the folded state of the tray table device 32a the cup holder unit 12a is in the stowed position. In the folded state of the tray table device 32a the grip element 22a of the cup holder unit 12a is visible when looking at the backside 56a of the passenger seat 34a. In the present embodiment the cup holder unit 12a has a different color than the table unit 10a. A presence of the cup holder unit 12a is therefore readily apparent for a passenger.

FIGS. 6 to 8b show three further embodiments of the invention. The following description and the figures are essentially restricted to the differences between the exemplary embodiments, wherein regarding equally denominated components, in particular regarding components with the same reference numeral, the figures and/or description from the other exemplary embodiments, in particular of FIGS. 1 to 5 may be considered. For distinguishing the exemplary embodiments, the letter a has been added to the reference numerals of the exemplary embodiment of FIGS. 1 to 5, whereas, in the exemplary embodiments of FIGS. 6 to 8b, the letter a has been replaced by the letters b to d.

Figure 6:
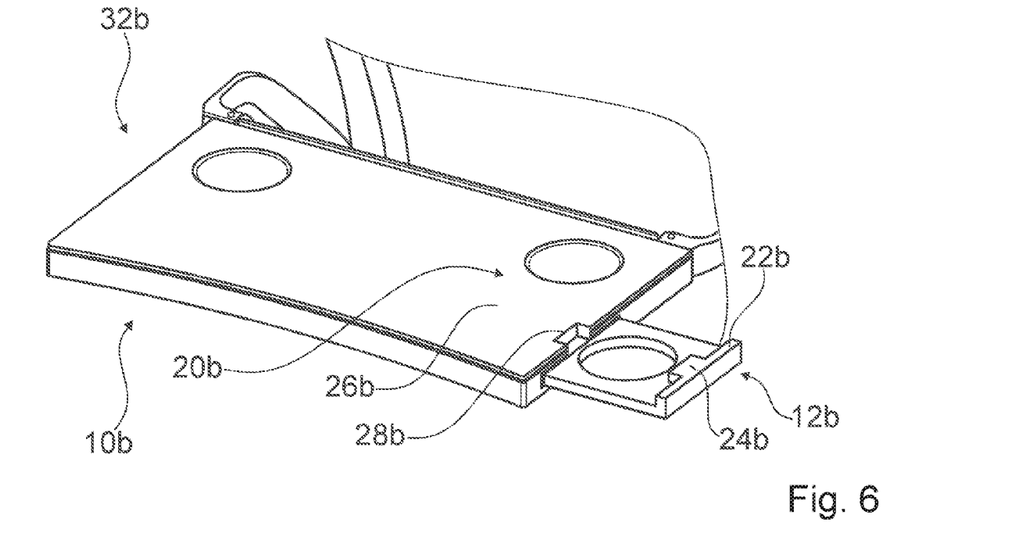

FIG. 6 shows an alternative tray table device 32b with a cup holder unit 12b in a perspective view. The cup holder unit 12b is provided in at least one position of use to at least partly hold at least one drinking vessel 14b. The cup holder unit 12b is movably mounted to a table unit 10b of the tray table device 32b. The cup holder unit 12b can be slid into the table unit 10b into a stowed position.

The cup holder unit 12b features a first recess 38b. The recess 38b implements a holding zone 16b for the drinking vessel 14b. In the position of use the drinking vessel 14b can be placed in the first recess 38b.

The cup holder unit 12b features a grip element 22b. The grip element 22b features a rectangular shape. The grip element 22b features a top surface 24b, which in the stowed position is aligned flush with a top surface 26b of the table unit 10b and forms a part of a table surface 20b.

The table unit 10b features a recess 28b, in which the grip element 22b is located in the stowed position. The recess 28b features a rectangular shape.

Figure 7:
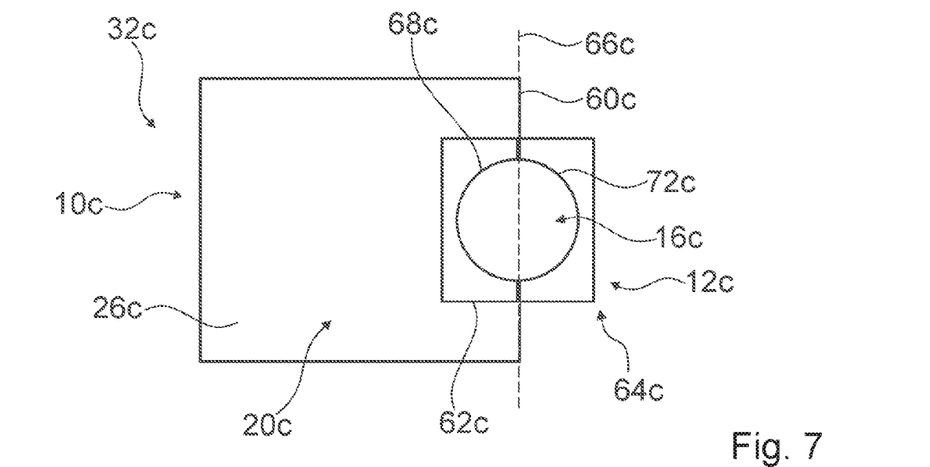

FIG. 7 shows a further alternative tray table unit 32c with a cup holder unit 12c in a schematic top view. The cup holder unit 12c is provided in at least one position of use to at least partly hold at least one drinking vessel 14c. The cup holder unit 12c is movably mounted to a table unit 10c of the tray table device 32c.

The cup holder unit 12c is swivel-mounted to the table unit 10c, in particular around a swivel axis 66c. The swivel axis 66c is oriented parallel to a side edge 60c of the table unit 10c. The cup holder unit 12c is located at the side edge 60c of the table unit 10c. It is also conceivable that a swivel-mounted cup holder unit is located at a different position of a table unit, for instance at a rear edge or a front edge.

The cup holder unit 12c can be folded into a stow recess 62c from the position of use into a stowed position. The stow recess 62c has a depth which approximately corresponds to a height of the cup holder unit 12c. In the stowed position a backside 64c of the cup holder unit 10c and a top surface 26c of the table unit 10c together implement a table surface 20c.

In the position of use the cup holder unit 12c and the table unit 10c together implement at least one holding zone 16c for the drinking vessel. In the position of use a part of an outer contour 68c of the table unit 10c implements at least a part of the holding zone 16c, in the present case a part of an outer contour 72c of the holding zone 16c.

Figure 8A:
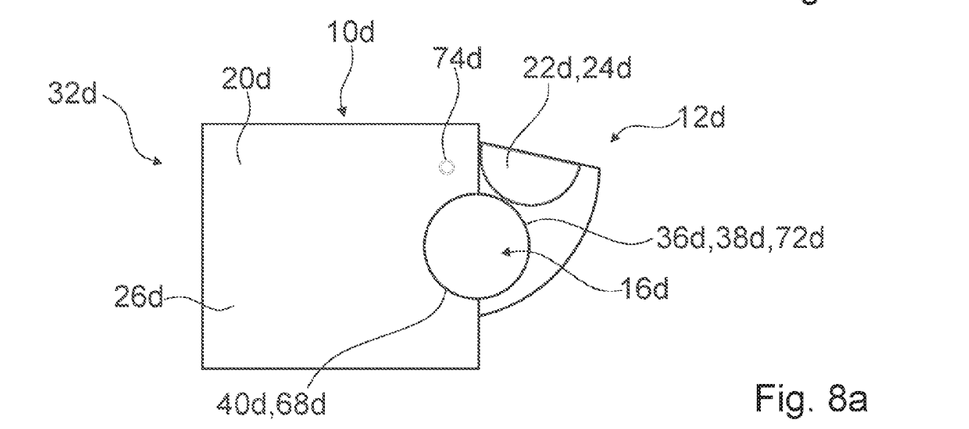
Figure 8B:
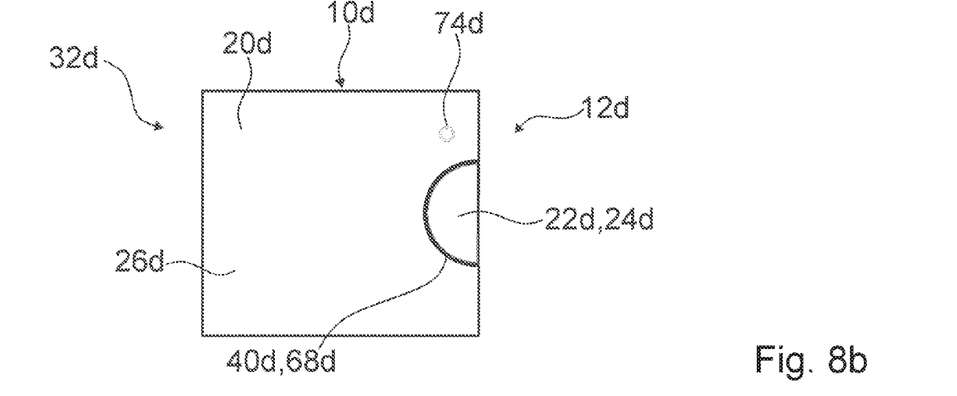

FIGS. 8a and 8b show a further alternative tray table device 32d with a cup holder unit 12d in a perspective view. FIG. 8a shows the cup holder unit 12d in a position of use. FIG. 8b shows the cup holder unit 12d in a stowed position. The cup holder unit 12d is provided in the position of use to at least partly hold at least one drinking vessel. The cup holder unit 12d is movably mounted to a table unit 10d of the tray table device 32d.

The cup holder unit 12d is swivel-mounted to the table unit 10d, in particular around a swivel axis through a swivel mount 74d, which runs perpendicular to a table surface 20d.

In the position of use the cup holder unit 12d and the table unit 10d together implement at least one holding zone 16d for the drinking vessel. The holding zone 16d features a holding recess 36d. At least in the position of use a main plane of extent of the holding recess 36d is at least substantially parallel to a main plane of extent of the table unit 10d.

The holding recess 36d is configured as a through hole in which the drinking vessel can be placed in the position of use. The cup holder unit 12d features a first recess 38d. The first recess 38a is a circular through hole. The table unit 10d features a second recess 40d. The second recess 40d has a semicircular shape. In the position of use the first recess 38d of the cup holder unit 12d and the second recess 40d of the table unit 10d together implement the holding recess 36d.

In the position of use a part of an outer contour 68d of the table unit 10d implements at least a part of the holding zone 16d, in the present case a part of an outer contour 72d of the holding zone 16d. In the present case the outer contour 68d of the table unit 10d is an outer contour of the second recess 40d.

In the stowed position the cup holder unit 12a and the table unit 10a together implement the table surface 20d. The cup holder unit 12d features at least one grip element 22d. In the stowed position a top surface 24d of the grip element 22d is at least partly aligned flush with a top surface 26d of the table unit 10d. The grip element 22d, in particular the top surface 24d of the grip element 22d, has a semicircular shape. A shape of the grip element 22d, in particular of the top surface 24d of the grip element 22d, is at least partly adapted to a shape of the second recess 40d of the table unit 10d.

REFERENCE NUMERALS 10 table unit
12 cup holder unit
14 drinking vessel
16 holding zone
18 edge
20 table surface
22 grip element
24 top surface
26 top surface
28 recess
30 contour
32 tray table device
34 passenger seat
36 recess
38 recess
40 recess
42 mounting unit
44 pivot axis
46 frame element
48 frame element
50 protrusion
52 protrusion
54 storage cavity
56 backside
58 fixing element
60 side edge
62 stow recess
64 backside
66 swivel axis
68 contour
70 direction
72 contour
74 swivel mount

The invention claimed is:

1. A tray table device, with at least one table unit and with at least one cup holder unit, which is provided in at least one position of use to at least partly hold at least one drinking vessel, wherein
   the cup holder unit is movably mounted to the table unit,
   in the position of use, a part of an outer peripheral edge of the table unit and a part of the cup holder unit are opposed to one another, and
   in the position of use, the part of the outer peripheral edge of the table unit and the part of the cup holder unit cooperate to define an opening for receiving the drinking vessel.

2. The tray table device according to claim 1, wherein in the position of use the cup holder unit is at least partly located outside a smallest cuboid containing the table unit.

3. The tray table device according to claim 1, wherein the cup holder unit is located at a rear edge of the table unit.

4. The tray table device according to claim 1, wherein the cup holder unit is sliding-mounted to the table unit.

5. The tray table device according to claim 1, wherein the cup holder unit can be stowed in at least one stowed position.

6. The tray table device according to claim 5, wherein in the stowed position the cup holder unit and the table unit together implement at least one table surface.

7. The tray table device according to claim 5, wherein the cup holder unit features at least one grip element.

8. The tray table device according to claim 7, wherein in the stowed position a top surface of the grip element is at least partly aligned flush with a top surface of the table unit.

9. The tray table device according to claim 7, wherein the table unit features at least one recess, in which the grip element is located in the stowed position.

10. The tray table device according to claim 5, wherein in the stowed position the cup holder unit and the table unit together implement at least one outside contour.

11. The tray table device according to claim 5, wherein the cup holder unit is at least partly located inside the table unit in the stowed position.

12. The tray table device according to claim 5, wherein the cup holder unit moves at least substantially parallel to a main plane of extent of the table unit during a transition between the position of use and the stowed position.

13. A passenger seat with a tray table device according to claim 1.

14. The tray table device according to claim 1, wherein in the use position, the opening is substantially circular.

15. The tray table device according to claim 1, wherein in the use position, the opening is a through-hole.

16. The tray table device according to claim 1, wherein the part of the outer peripheral edge of the table unit includes a semicircular curve, and the part of the cup holder unit includes a semicircular curve.

17. A tray table device with at least one table unit and with at least one cup holder unit, which is provided in at least one position of use to at least partly hold at least one drinking vessel, wherein
   the cup holder unit is movably mounted to the table unit,
   in the position of use, a part of an outer peripheral edge of the table unit and a part of the cup holder unit are opposed to one another,
   in the position of use, the part of the outer peripheral edge of the table unit and the part of the cup holder unit cooperate to define an opening for receiving the drinking vessel, and
   in the position of use, the opening lies in plane that is at least substantially parallel to a main plane of extent of the table unit.

* * * * *